(12) United States Patent
Wang et al.

(10) Patent No.: US 7,796,787 B2
(45) Date of Patent: Sep. 14, 2010

(54) FACE COMPONENT REPLACEMENT

(75) Inventors: Jin Wang, Hangzhou (CN); Jianfeng Li, Hangzhou (CN); Huaqui Zhang, Hangzhou (CN); Guogang Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 876 days.

(21) Appl. No.: 11/670,963

(22) Filed: Feb. 3, 2007

(65) Prior Publication Data

US 2008/0187224 A1 Aug. 7, 2008

(51) Int. Cl.
*G06K 9/00* (2006.01)
(52) U.S. Cl. .................... 382/118; 382/115; 382/116; 382/117; 382/128
(58) Field of Classification Search .................. 382/118, 382/115, 116, 117, 128
See application file for complete search history.

(56) References Cited

U.S. PATENT DOCUMENTS

2001/0014182 A1* 8/2001 Funayama et al. .......... 382/282
2005/0265605 A1* 12/2005 Nakamoto et al. .......... 382/209

OTHER PUBLICATIONS

Jingfeng Han, "Thomas Algorithm," Tutorials to Scientific Computing (Matlab programming), SS2005, 2 pages.
Jonathan Richard Shewchuk, "An Introduction to the Conjugate Gradient Method Without the Agonizing Pain," Edition 1¼, Aug. 4, 1994, School of Computer Science, Carnegie Mellon University, pp. 1-58.

* cited by examiner

*Primary Examiner*—Matthew C Bella
*Assistant Examiner*—Mike Rahmjoo
(74) *Attorney, Agent, or Firm*—Patent Law Group LLP; David C. Hsia (57) ABSTRACT

A method is provided for cloning a facial feature template image into an original image including a face to form a new image. The method includes detecting the face and facial features in the original image, reducing the original and the template images, cloning the reduced template image into the reduced original image to form a new image, enlarging the new image, and displaying the enlarged new image. The method may use Poisson cloning where a resulting system of linear equations is solved by applying a Thomas algorithm to determine an initial solution and applying a Conjugate Gradient algorithm using the initial solution to determine a final solution to the system of linear equations.

18 Claims, 9 Drawing Sheets

FACE COMPONENT REPLACEMENT

CROSS REFERENCE TO RELATED APPLICATIONS

This application is related to U.S. application Ser. No. 11/323,653, entitled "Face Detection on Mobile Devices," and U.S. application Ser. No. 11/323,654, entitled "Facial Feature Detection on Mobile Devices," which are filed on Dec. 31, 2005, commonly assigned, and incorporated by reference in their entirety.

FIELD OF INVENTION

This invention relates to a method for replacing facial components in an image.

DESCRIPTION OF RELATED ART

Poisson cloning/blending is a tool for inserting and blending a source image into a destination image. Poisson cloning is done in the space of changes, also called the gradient domain. After cloning, the changes are integrated back into the image. Adobe Photoshop has included Poisson cloning in a feature called Healing Brush since version 7.0.

BRIEF DESCRIPTION OF THE DRAWINGS

The patent or application file contains at least one drawing executed in color. Copies of this patent or patent application publication with color drawings will be provided by the Office upon request and payment of the necessary fee.

Use of the same reference numbers in different figures indicates similar or identical elements.

SUMMARY

In one embodiment of the invention, a method is provided for cloning a facial feature template image into an original image including a face to form a new image. The method includes detecting the face and facial features in the original image, reducing the original and the template images, cloning the reduced template image into the reduced original image to form a new image, enlarging the new image, and displaying the enlarged new image. In one embodiment, the method uses Poisson cloning where a resulting system of linear equations is solved by applying a Thomas algorithm to determine an initial solution and applying a Conjugate Gradient algorithm using the initial solution to determine a final solution to the system of linear equations.

DETAILED DESCRIPTION

Figure 1:
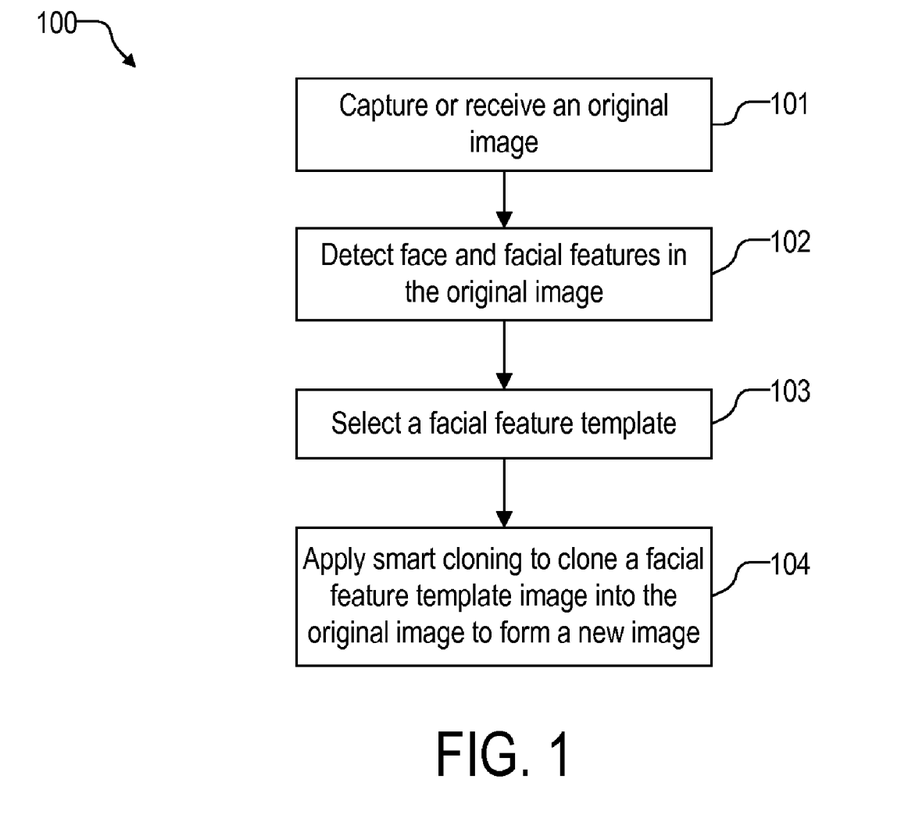
FIG. 1 is a flowchart for a smart cloning method to clone a facial feature template image into an original image in one embodiment of the invention.

FIG. 1 is a flowchart of a method 100 for replacing a feature in a destination image with a replacement feature from a source image in one embodiment of the invention. In one embodiment, method 100 replaces a facial feature of a person in a photograph with a replacement facial feature in order to generate a humorous photograph. Method 100 is efficient so that it can be implemented with software executed by a processor on a mobile and handheld device with limited RAM and computation ability, such as a mobile phone with an ARM9 processor.

Figure 2:
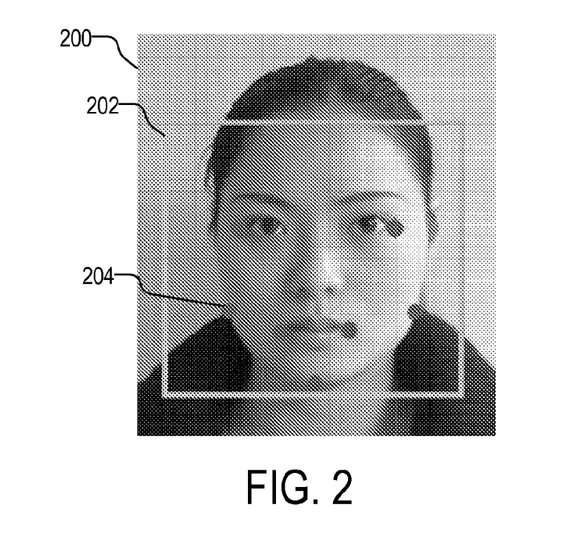
FIG. 2 illustrates an original image with identified face and facial features in one embodiment of the invention.

In step 101, the device captures or otherwise receives an original image 200 (FIG. 2). Step 101 is followed by step 102.

Figure 4:
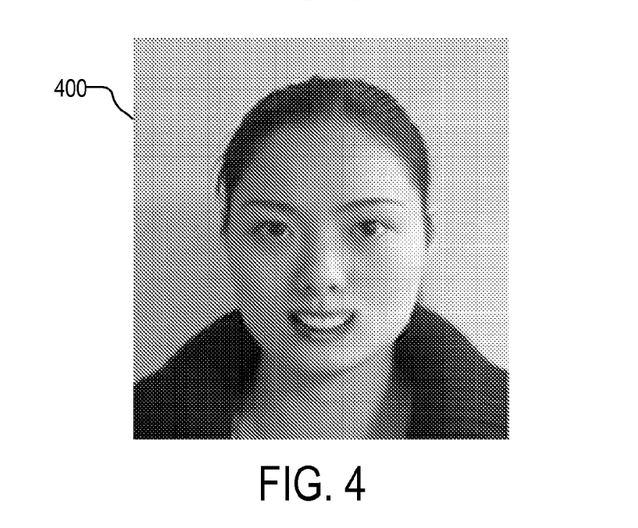
FIG. 4 illustrates a result of applying the smart cloning method of FIG. 1 to the original image of FIG. 2 and the template of FIG. 3 in one embodiment of the invention.

In step 102, the device detects a face 202 in original image 200 and facial features from face 202. The facial features are identified by facial feature points 204 (only one is labeled). The details for detecting face 202 and facial feature points 204 are described in U.S. application Ser. Nos. 11/323,653 and 11/323,654, which were filed on Dec. 31, 2005, commonly assigned, and incorporated by reference in their entirety. The device later uses the facial feature points 204 to identify a domain (i.e., an area) on original image 200 where a facial feature can be replaced or inserted to generate a new image 400 (FIG. 4). The facial feature may be hair, eye brows, eyes, ears, mouth, and mustache. Step 102 is followed by step 103.

Figure 3:
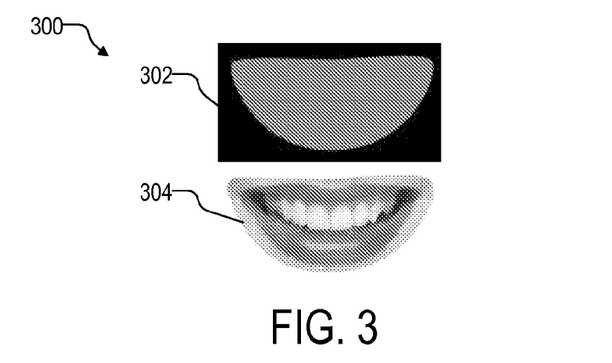
FIG. 3 illustrates a facial feature template with a template mask and a template image in one embodiment of the invention.

In step 103, the device prompts the user to select one of several facial feature templates. In response, the device receives the selection of a facial feature template 300 (FIG. 3). Template 300 includes a template mask 302 and a template image 304 of a facial feature. The device later uses template mask 302 and facial feature points 204 to identify an area on destination image 200 to be cloned with source image 304. Step 103 is followed by step 104.

In step 104, the device applies smart cloning to replace or insert the facial feature of template 300 into original image 200 to generate new image 400 (FIG. 4). First, the device places template mask 302 on original image 200 based on a predetermined relationship between facial feature points 204 and the facial feature type of template 300. The device then clones template image 304 into the area identified by template mask 302 on original image 200. The device performs the cloning naturally and seamlessly to match the color of original image 200 and template image 304. Smart cloning is based on a method 1000 (FIG. 10) utilizing Poisson cloning 900 (FIG. 9) described later in detail.

Figure 5:
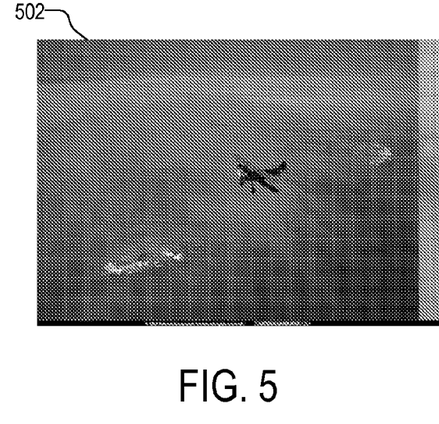
FIGS. 5, 6, 7, and 8 demonstrate the color variation addressed by the smart cloning method of FIG. 1 in one embodiment of the invention.
Figure 6:
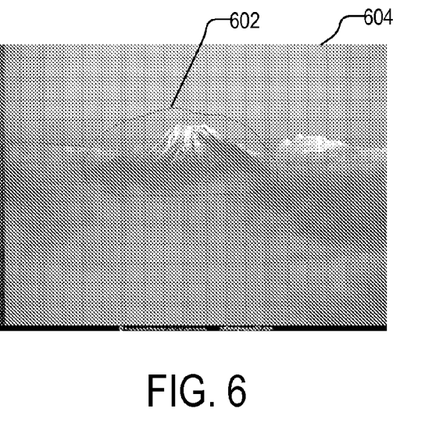
Figure 7:
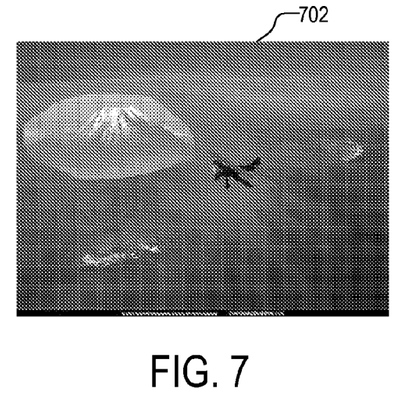

FIGS. 5 to 8 illustrate why smart cloning method 800 is necessary. FIGS. 5 and 6 illustrate a portion 602 of an image 604 that the user wishes to insert into another image 502. FIG. 7 illustrates a direct cut and paste of portion 602 into image

Figure 8:
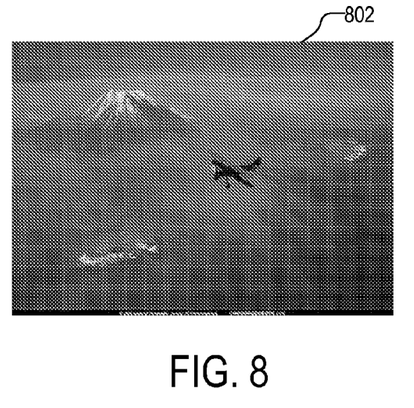

502. The resulting image 702 is not desirable because the color differences between image 502 and portion 602 are very apparent. FIG. 8 illustrates the smart cloning of portion 602 into image 502. The resulting image 802 shows that image 502 and portion 602 are combined naturally and seamlessly.

Figure 9:
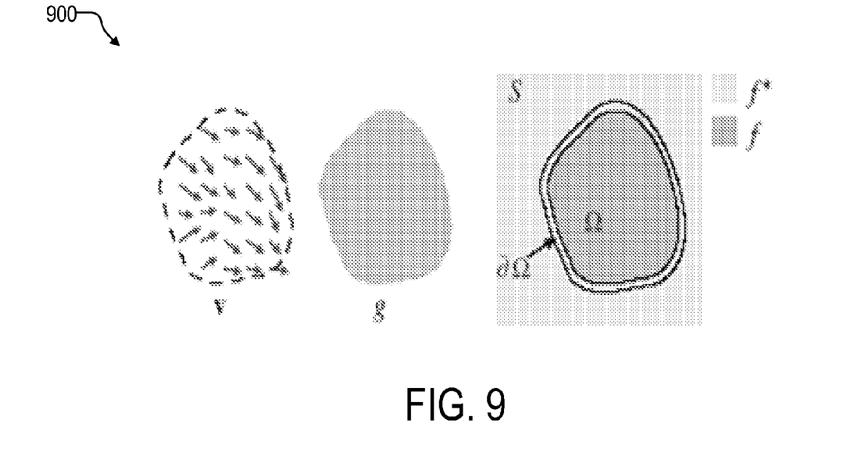
FIG. 9 illustrates notations in the Poisson cloning used in the smart cloning method of FIG. 1 in one embodiment of the invention.

FIG. 9 illustrates the notations used in a method 900 for Poisson cloning, where S is the image definition domain (i.e., the destination image), Ω is a closed subset of S with boundary ∂Ω (i.e., the domain in the destination image to be cloned with a source image and having a boundary around the domain), $f^*$ is a scalar function defined over S minus the interior of domain Ω (i.e., the values of the destination image excluding the domain to be cloned), $f$ is an unknown scalar function defined over the interior of domain Ω (i.e., the values in the domain to be cloned), g is a source function (i.e., the values of the source image to be cloned into the destination image), and v is a vector field defined over Ω of source function g. In this example, vector field v is the gradient field of the source function g. To combine the source and the destination images naturally and seamlessly, result function $f$ must be determined so that:

$$\min_f J(f) = \min_f \int_\Omega |\nabla f - v|^2 \text{ with } f_{\partial \Omega} = f^*_{\partial \Omega}, \quad (1)$$

Equation (1) has the form of the Poisson Equation and therefore this method is named Poisson cloning. Note that method 900 for Poisson cloning is performed to each of the three color channels separately when color images are cloned.

For discrete images the problem can be discretized naturally using the underlying discrete pixel grid. Without losing generality, the same notations are used for the continuous objects and their discrete counterparts. Thus, domains S and Ω now become finite point sets defined on an infinite discrete grid. Note that domain S can include all the pixels of an image or only a subset of them. For each pixel p in domain S, $N_p$ is the set of its 4-connected neighbors which are in domain S, <p, q> denote a pixel pair such that q ∈ $N_p$, boundary ∂Ω is now equal to {p ∈ S \Ω:$N_p \cap \Omega \neq 0$}, and $f_p$ is the value of result function $f$ at pixel p. After further derivation, a system of linear equations results as follows:

$$|N_p|f_p - \sum_{q \in N_p \cap \Omega} f_q = \sum_{q \in N_p \cap \partial\Omega} f^*_q + \lambda_1 \sum_{q \in N_p \cap \Omega} v_{pq}, \forall p \in \Omega \quad (2)$$

Here $\lambda_1$ is a parameter to control the effect of vector field v. When vector field v is the gradient field of source function g, then $v_{pq} = g_p - g_q$. The system of linear equations can be iteratively solved to determine result function $f$ defined over the interior of domain Ω (i.e., the pixel values in the domain to be cloned). For more details on Poisson cloning, please refer to "Poisson Image Editing" by Patrick Perez et al., Microsoft Research UK, 2003.

Figure 10:
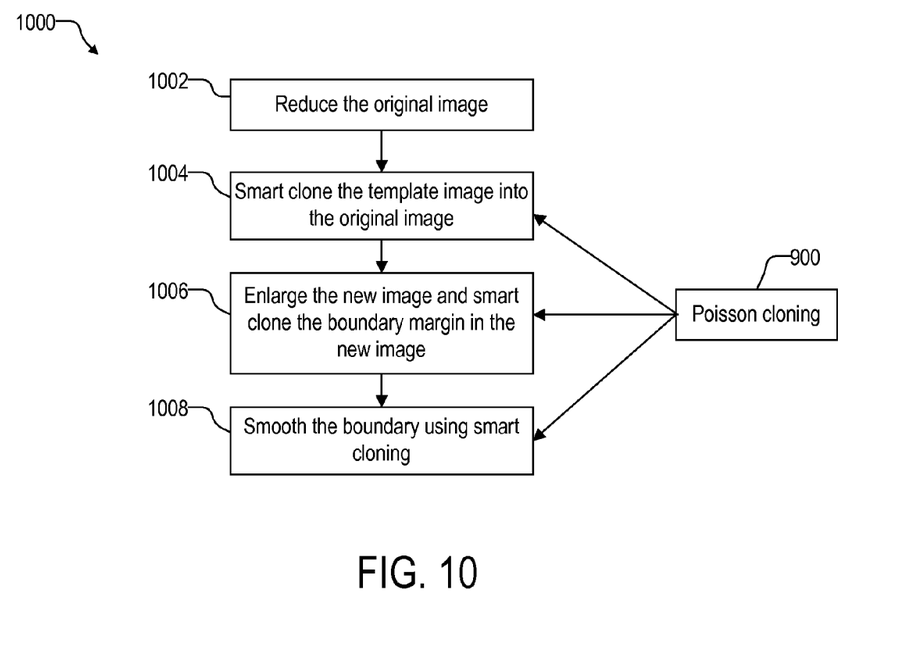
FIG. 10 is a flowchart of a smart cloning step in the smart cloning method of FIG. 1 in one embodiment of the invention.
Figure 11A:
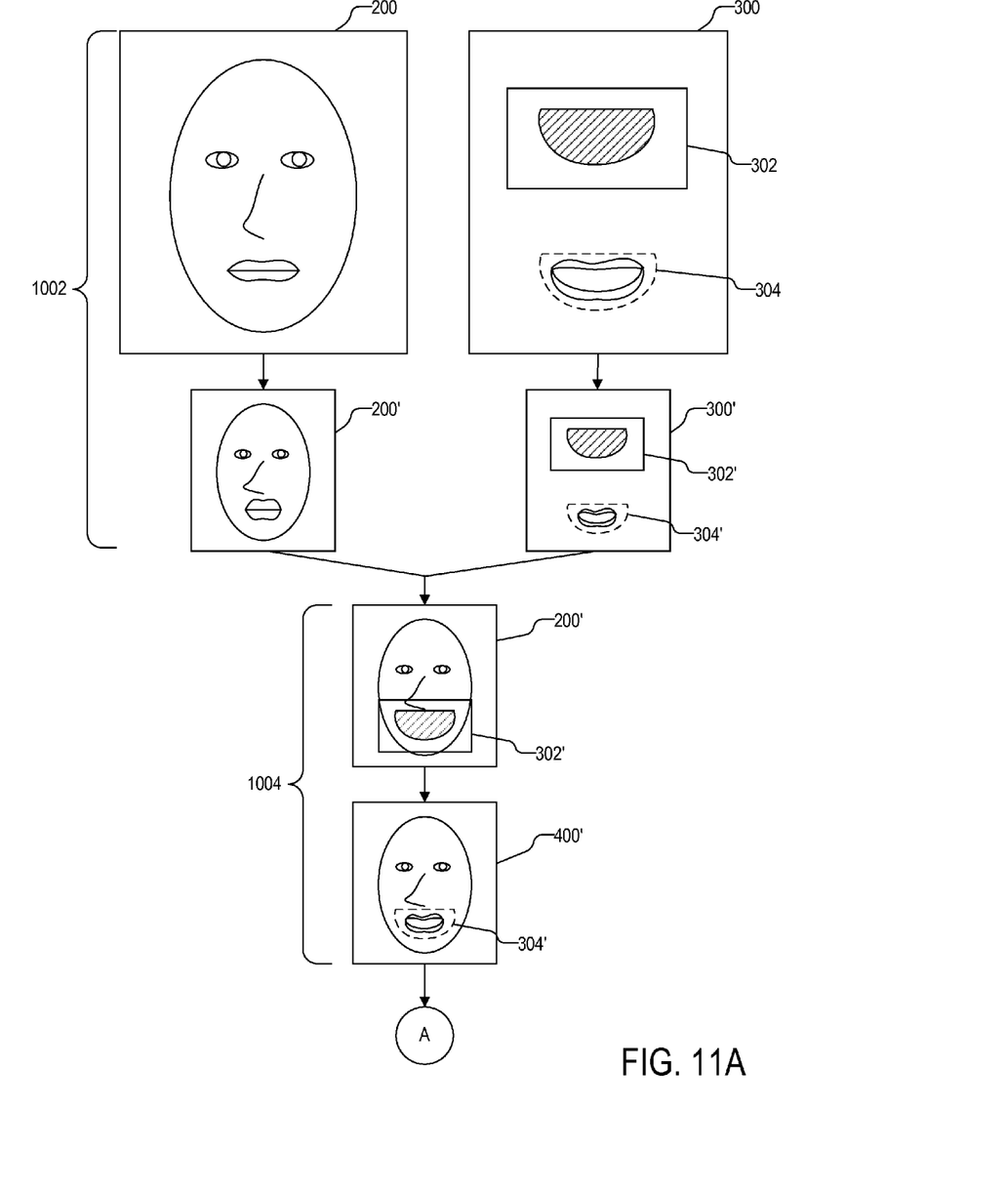
FIGS. 11A, 11B, and 11C illustrate the application of the smart cloning step of FIG. 10 in one embodiment of the invention.
Figure 11B:
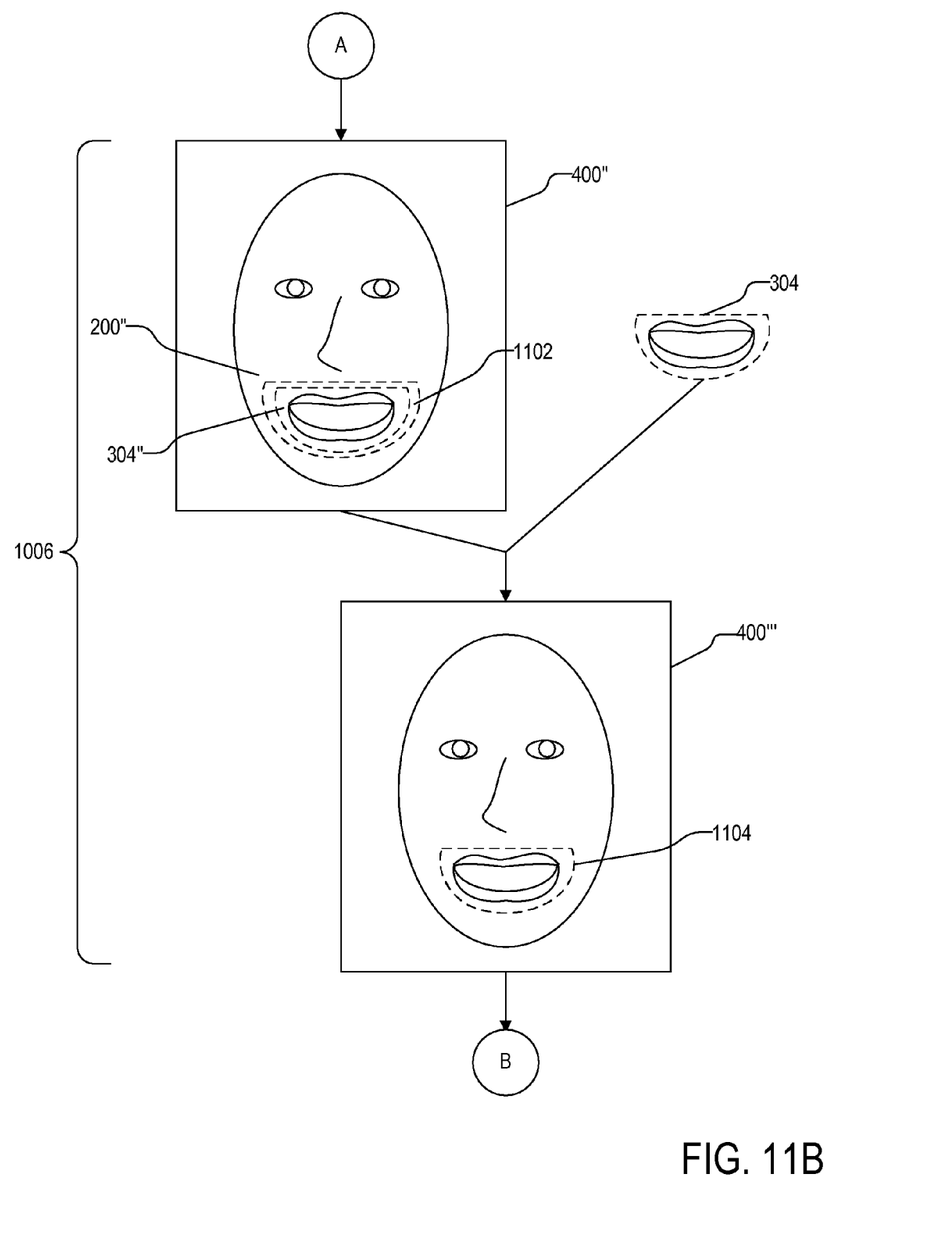
Figure 11C:
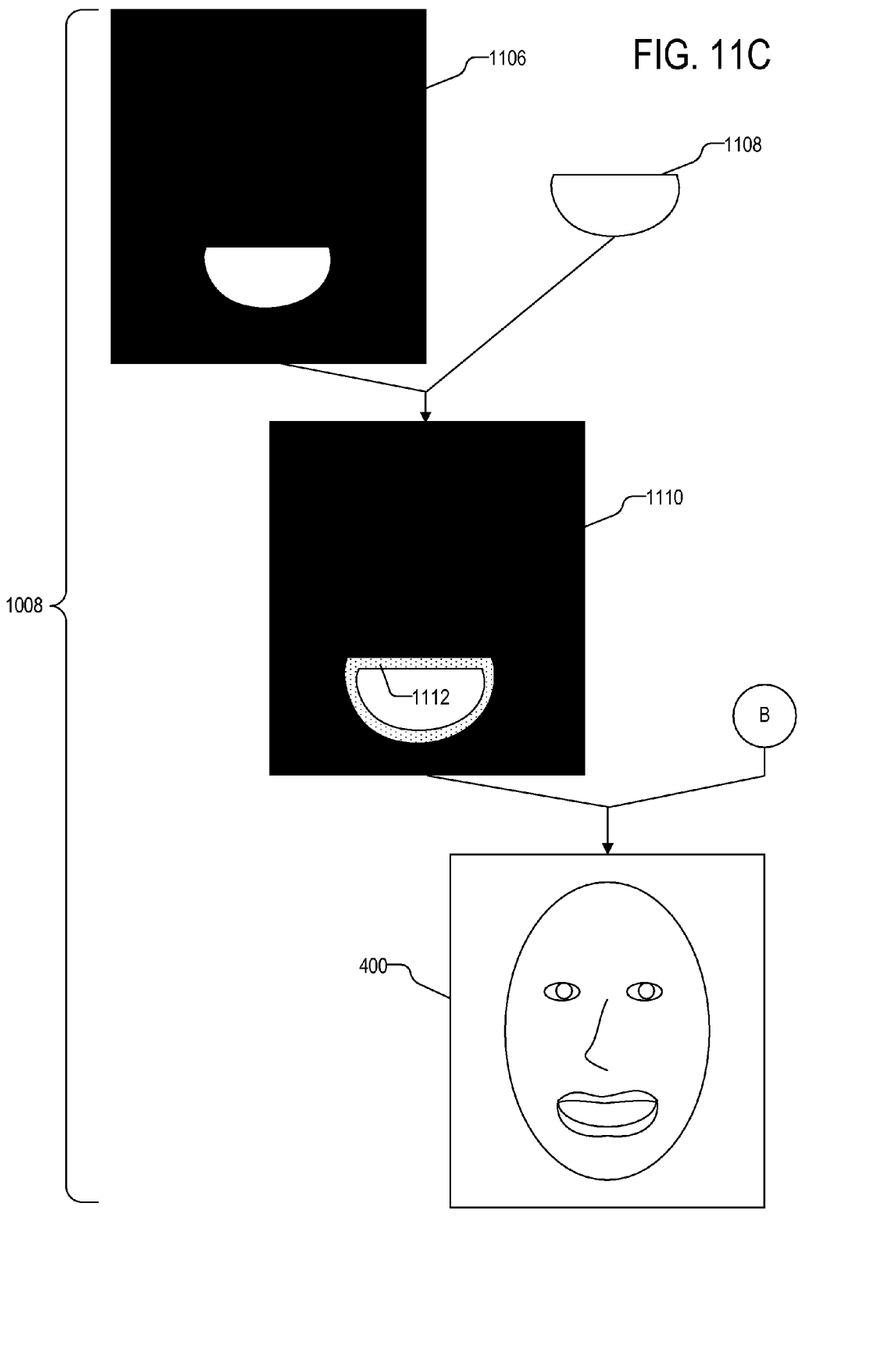

FIG. 10 is a flowchart of a method 1000 with Poisson cloning used in smart cloning step 104 (FIG. 1) in one embodiment of the invention. FIGS. 11A, 11B, and 11C illustrate the application of method 1000 to clone template image 304 into original image 200 in a natural and seamless fashion. Together FIGS. 10, 11A, 11B, and 11C are used hereafter to describe smart cloning step 104 with Poisson cloning in more detail.

In step 1002 of FIGS. 10 and 11A, the processor reduces the size of original image 200 to form original image 200'. The processor may also reduce template mask 302 and template image 304 of template 300 to form template mask 302' and template image 304' that match the size of image 200'. In one embodiment, the processor reduces the image size by down-sampling using a step size of 4. Step 1002 is followed by step 1004.

In step 1004 of FIGS. 10 and 11A, the processor applies Poisson cloning to clone template image 304' into original image 200' to form a new image 400'. For the Poisson cloning in this step, domain S is original image 200', domain Ω is an area defined by template mask 302' on original image 200', destination function $f^*$ is the pixel values of original image 200' excluding domain Ω, and source function g is the pixel values of template image 304'. In one embodiment, the system of linear equations (2) produced in Poisson cloning is iteratively solved using a method 1200 described later in detail. Step 1004 is followed by step 1006.

In step 1006 of FIGS. 10 and 11B, the processor enlarges new image 400' to generate a new image 400" that matches the original size of template 300. In one embodiment, the processor enlarges portion 304' in new image 400' using a difference interpolation algorithm from known pixels of portion 304' and its source, template image 304, to form a portion 304" in new image 400". The processor enlarges the remainder of new image 400' by filling the corresponding pixels in enlarged new image 400' with pixels from original image 200 to form a portion 200" of enlarged new image 400".

Figure 11D:
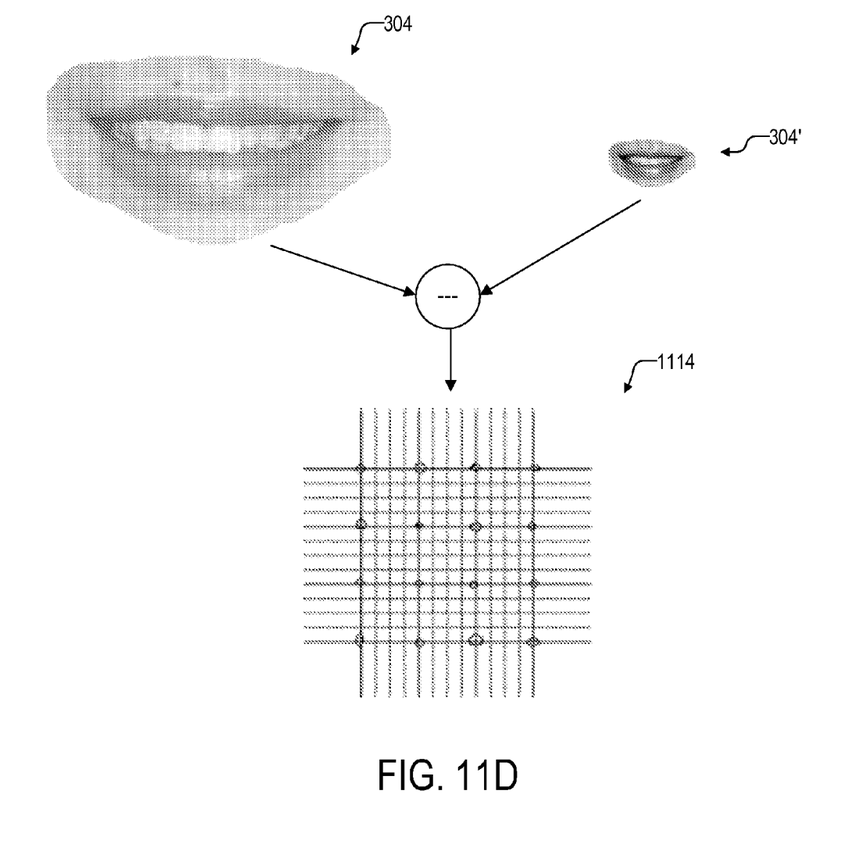
FIG. 11D illustrates the application of difference interpolation in one embodiment of the invention.

FIG. 11D illustrates how the difference interpolation algorithm enlarges portion 304' to portion 304". The processor first directly enlarges portion 304' to the size of image 304 so the resulting enlarged portion 304' is missing pixels between known pixels at its new size. The processor then subtracts the known pixels of enlarged portion 304' from corresponding pixels in template image 304 to form a difference image 1114, wherein the known pixel differences are shown with circles and the missing pixels are illustrated as the intersections between the vertical and horizontal gridlines. The processor applies bilinear interpolation to difference image 1114 to fill in the missing pixels in difference image 1114. The process then adds the interpolated difference image 1114 to image 304 to form portion 304".

Note that a boundary margin 1102 of missing pixels exists between portions 200" and 304" in new image 400" these pixels do not belong to either portion 304' or the remainder of new image 200'. Referring back to FIGS. 10 and 11B, the processor applies Poisson cloning to clone part of template image 304 into boundary margin 1102 of new image 400" to form a new image 400'''. For the Poisson cloning in this step, domain S is original image 200", domain Ω is boundary margin 1102, destination function $f^*$ is the pixel values of the original image 200" excluding domain Ω, and source function g is the pixel values of template image 304. In one embodiment, the system of linear equations (2) produced in Poisson cloning is iteratively solved using a method 1200 described later in detail. Step 1006 is followed by step 1008.

In step 1008 of FIGS. 10 and 11C, the processor smoothes a boundary 1104 (FIG. 11B) defined by template mask 302 on new image 400''' by creating an alpha image 1110 using Poisson cloning and then uses alpha image 1110 to combine new image 400''' and original image 200 to form new image 400.

For the Poisson cloning in this step, domain S is an image 1106 having the same size as new image 400", domain Ω is the boundary of template mask 302 placed on domain S, destination function $f^*$ is a scalar function defined over domain S where all pixels within template mask 302 are set to 0 and all pixels outside template mask 302 are set to 255, and source function g is an image 1108 with all pixel set to 0. In one embodiment, the system of linear equations (2) produced in Poisson cloning is iteratively solved using a method 1200 described later in detail. As can be seen, the resulting alpha image 1110 has a gray boundary 1112 where pixels smoothly transition from 0 inside to 255 outside.

Combing new image 400''' and original image 200 using alpha image 1110 is accomplished by the following formula:

$$R=(I_1+\alpha I_2)/255, \quad (2.5)$$

where R is new image 400, $I_1$ is new image 400'', a is alpha image 1110, and $I_2$ is original image 200. The smooth transition of gray boundary 1112 in alpha image 1110 provides for the smooth boundary 1104 in new image 400.

Solving the Poisson Equation

Figure 12:
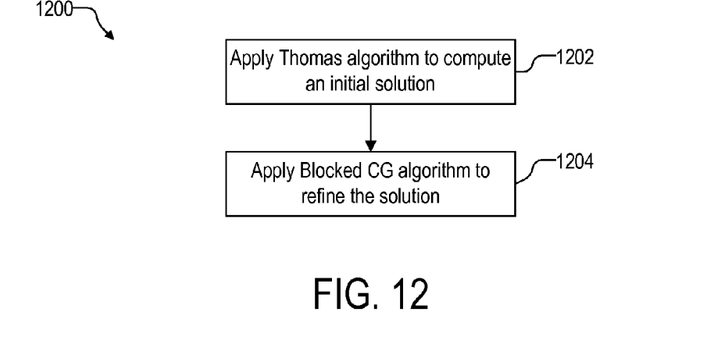
FIG. 12 is a flowchart of a Block Thomas-Conjugate Gradient (CG) method to solve a system of linear equations from the Poisson Cloning created in the smart cloning step of FIG. 10 in one embodiment of the invention.

For a template image having a size of 100*100 pixels, Poisson cloning would results in a system of 100*100 linear equations (2). This number of linear equations is very computationally demanding, especially for a mobile or handheld device with limited RAM and computation ability. To quickly solve this system, two strategies are adopted. First, as described above, the device applies smart cloning to reduced template image and original image. Second, as described hereafter, the device applies a novel method 1200 hereafter referred to as Block Thomas-CG to solve the system of linear equations (2).

FIG. 12 illustrates a flowchart of method 1200 in one embodiment of the invention. In step 1202, the device applies the conventional Thomas algorithm to solve the system of linear equations (2) first by row and then by column. The device then averages the solutions for the rows and the solutions for the columns to create an initial solution to the system of linear equations (2).

In solving the system by row, pixel p has coordinates (x, y) and neighborhood $N_p$ is a row section with radius of 1 (i.e., a neighborhood of 3 adjacent pixels in a row). For each connected row section $\Omega=(a, b)$ on row y, $\partial \omega=a$ or $b$, for all $x \in (a, b)$ and all $i=-1,0,1$, linear equation (2) becomes:

$$3f_{x,y} - \sum_{(x+i)\in(a,b)} f_{x+i,y} = \sum_{x+i=a \text{ or } b} f^*_{x+i,y} + \lambda_1 \sum_{(x+i)\in(a,b)} v_{(x,y),(x+i,y)} \quad (3)$$

This system is equivalent to AX=Y, here:

$$A = \begin{bmatrix} 2 & -1 & 0 & \cdots & 0 \\ -1 & 2 & -1 & \cdots & 0 \\ 0 & -1 & 2 & \cdots & 0 \\ \vdots & \vdots & \vdots & \vdots & \vdots \\ 0 & 0 & 0 & \cdots & 2 \end{bmatrix} \quad (4)$$

Since matrix A is a tridiagonal matrix, the device can solve this system by using the Thomas algorithm. Furthermore, the Thomas algorithm may be implemented with only addition, subtraction, and shift operations for fast computation that requires little memory.

In solving the system by column, neighborhood $N_p$ is a column section with radius of 1 (a neighborhood of 3 adjacent pixels in a column). For each connected column section $\Omega=(a, b)$ on row x, $\partial \Omega=a$ or $b$, for all $y \in (a, b)$ and all $i=-1,0,1$, linear equation (2) becomes:

$$3f_{x,y} - \sum_{(y+i)\in(a,b)} f_{x,y+i} = \sum_{y+i=a \text{ or } b} f^*_{x,y+i} + \lambda_1 \sum_{(y+i)\in(a,b)} v_{(x,y)(x,y+i)} \quad (5)$$

This system is again equivalent to AX=Y where A is a tridiagonal matrix. Thus, the device can solve this system using the Thomas algorithm implemented with only addition, subtract, and shift operations. The device determines a final solution as the average of the solution computed by row and the solution computed by column. This final solution becomes the initial solution to a block Conjugate Gradient (CG) method in step 1204.

In step 1204, the device considers both the rows and the columns altogether. Linear equation (2) is rewritten in the form of AX=Y, where matrix A is written as a symmetric block matrix of:

$$A = \begin{bmatrix} A_1 & B_1 & \cdots & 0 & 0 \\ C_2 & A_2 & \cdots & 0 & 0 \\ \vdots & \vdots & \vdots & \vdots & \vdots \\ 0 & 0 & \cdots & A_{m-1} & B_{m-1} \\ 0 & 0 & \cdots & C_m & A_m \end{bmatrix} \quad (6)$$

Every row in matrix A represents a corresponding row in a template mask. Each $A_i$ is denoted as:

$$A_i = \begin{bmatrix} A_{i0} & 0 & \cdots & 0 \\ 0 & A_{i1} & \cdots & 0 \\ \vdots & \vdots & \vdots & \vdots \\ 0 & 0 & \cdots & A_{iS_i} \end{bmatrix} \text{ here each} \quad (7)$$

$$A_{ij} = \begin{bmatrix} 4 & -1 & 0 & \cdots & 0 \\ -1 & 4 & -1 & \cdots & 0 \\ 0 & -1 & 4 & \cdots & 0 \\ \vdots & \vdots & \vdots & \vdots & \vdots \\ 0 & 0 & 0 & \cdots & 4 \end{bmatrix}$$

Each $C_i$ is the transpose of $B_{i-1}$ and each $C_i$ can be denoted as:

$$C_i = \begin{bmatrix} C_{i0} & 0 & \cdots & 0 \\ 0 & C_{i1} & \cdots & 0 \\ \vdots & \vdots & \vdots & \vdots \\ 0 & 0 & \cdots & C_{iS_i} \end{bmatrix} \text{ here each} \quad (8)$$

$$C_{ij} = \begin{bmatrix} \cdots & -1 & 0 & \cdots & \cdots \\ \cdots & 0 & -1 & \cdots & \cdots \\ \cdots & \cdots & \cdots & \cdots & \cdots \\ \cdots & \cdots & \cdots & \cdots & -1 \\ \cdots & \cdots & \cdots & \cdots & \cdots \end{bmatrix}$$

The particular left matrix will be determined by the template mask. Since it is still well-regulated, the device can store the left matrix in a small memory. More specifically, matrix $A_{ij}$ can be describe das a simple two dimension array (matrix type, matrix length), and stored using very little memory space. The device then applies a Blocked CG method 1300 (FIG. 13) to settle these equations.

Figure 13:
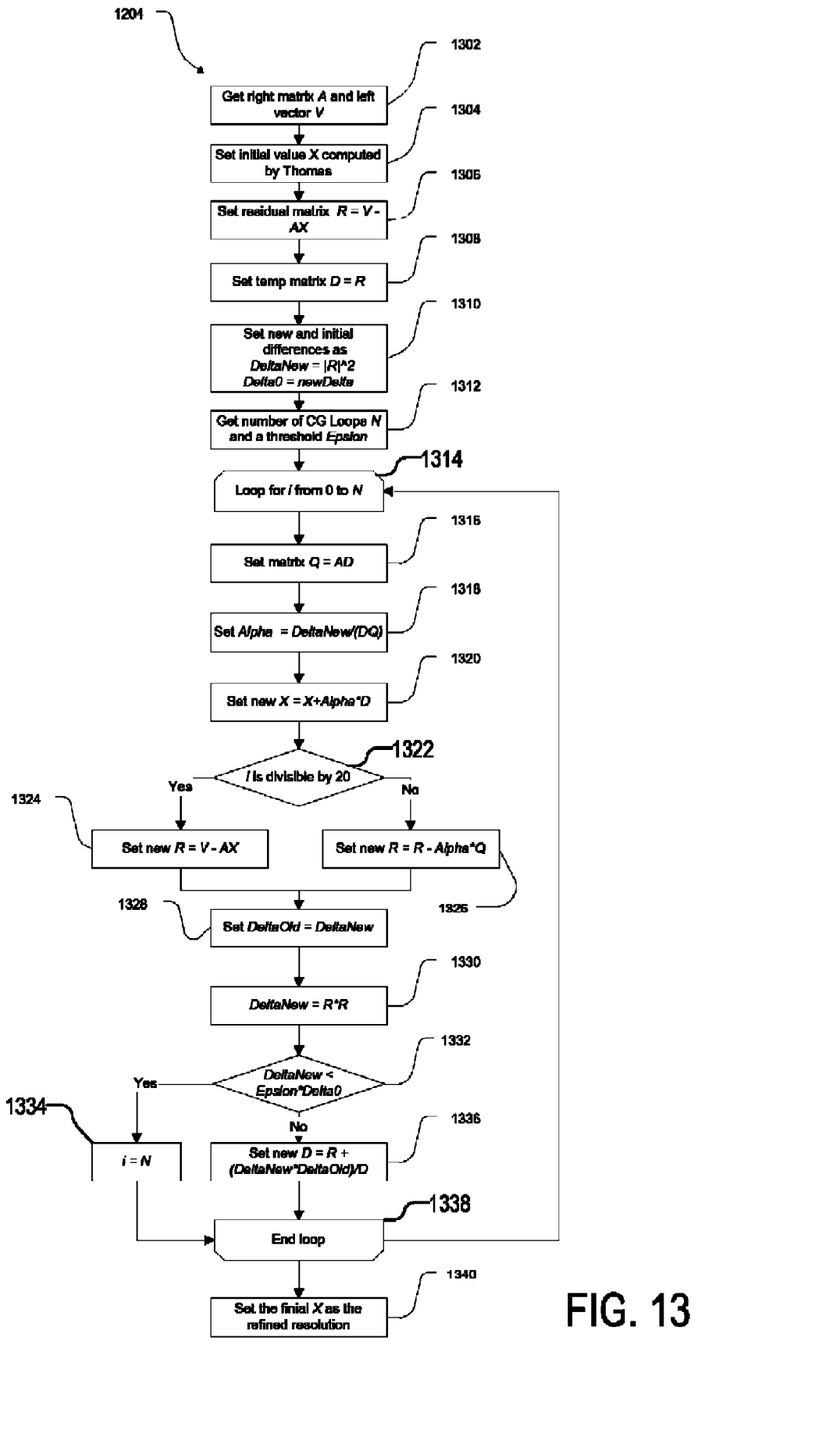
FIG. 13 is a flowchart of a Block Conjugate Gradient algorithm used in the Block Thomas-CG Gradient method of FIG. 12 in one embodiment of the invention.

FIG. 13 is a flowchart of Block CG method 1300 in one embodiment of the invention. Method 1300 is similar to a conventional CG method except that matrix operations in steps 1306, 1310, 1316, 1318, 1320, 1324, 1326, 1330, and 1336 are decomposed into block matrix operations.

Block CG method 1300 can be implemented with only addition, subtraction, and shift operations for fast computation that requires little memory. Furthermore, Block CG method 1300 starts with an initial solution X determined from the Thomas algorithm in step 1202 so that Block CG method 1300 will quickly find a satisfying cloning result with few iterations (e.g., typically in less than 20 iterations). In one embodiment, the maximum number of loops N is set as 10 and the threshold Epsilon for determining a satisfying result is set as 0.000001.

Various other adaptations and combinations of features of the embodiments disclosed are within the scope of the invention. Numerous embodiments are encompassed by the following claims.

What is claimed is:

1. A method for cloning a template image of a facial feature into an original image including a face to include the facial feature, comprising:
   detecting facial features in the original image;
   reducing one or more of the original image and a template with the template image and a template mask in size;
   cloning, using a programmed processor, the reduced template image into the reduced original image at a location based on the reduced template mask and locations of the facial features on the reduced original image to form a new image, comprising:
      placing the reduced template mask on the reduced original image at the location based on the locations of the facial features to determine a cloning area to clone the reduced template image into the reduced original image; and
      applying Poisson cloning to clone the reduced template image into the reduced original image at the cloning area to form the new image;
   enlarging the new image; and
   displaying the enlarged new image.

2. The method of claim 1, wherein said enlarging the new image comprises:
   directly enlarging the reduced template image to match the template image at its original size where the enlarged reduced template image is missing pixels between known pixels;
   subtracting known pixels in of the enlarged reduced template image from corresponding pixels in the template image to form a difference image;
   applying bilinear interpolation to the difference image to fill in missing pixels in the difference image; and
   adding the difference image to the template image to form a portion of the enlarged new image.

3. The method of claim 2, after said enlarging the new image and prior to said displaying the enlarged new image, further comprising:
   cloning a portion of the template image at its original size into a boundary margin of missing pixels between the portion and an other portion of the enlarged new image.

4. The method of claim 3, wherein said cloning a portion of the template image at its original size into a boundary margin of missing pixels between the portion and an other portion of the enlarged new image comprises:
   applying Poisson cloning to clone the portion of the template image into the boundary margin of missing pixels between the portion and the other portion of the enlarged new image.

5. The method of claim 3, after said cloning a portion of the template image and prior to said displaying the enlarged new image, further comprising:
   smoothing a boundary between the portion and the other portion of the enlarged new image.

6. The method of claim 5, wherein said smoothing a boundary comprises:
   applying Poisson cloning to clone a source image into a destination image having same size as the enlarged new image to form an alpha image, all pixel in the source image having values of 0, all pixels within the boundary in the destination image having values of 0, and all pixels outside of the boundary in the destination image having values of 255; and
   using the alpha image to merge the enlarged new image and the original image.

7. The method of claim 1, 4, or 6, wherein said applying Poisson cloning comprises:
   generating a system of linear equations;
   applying a Thomas algorithm to determine an initial solution; and
   applying a Conjugate Gradient algorithm using the initial solution to determine a final solution to the system of linear equations.

8. The method of claim 7, wherein said applying a Thomas algorithm comprises:
   determining a first solution to the system of linear equations by row;
   determining a second solution to the system of linear equation by column; and
   averaging the first and the second solutions to create the initial solution.

9. The method of claim 8, wherein said applying a Conjugate Gradient algorithm comprises applying block matrix operations to determine the final solution to the system of linear equations.

10. A non-transitory computer-readable storage medium encoded with executable instructions for execution by a processor to clone a template image of a facial feature into an original image including a face to include the facial feature, the executable instructions comprising:
   detecting facial features in the original image;
   reducing one or more of the original image and a template with the template image and a template mask in size;
   cloning, using a programmed processor, the reduced template image into the reduced original image at a location based on the reduced template mask and locations of the facial features on the reduced original image to form a new image, comprising:
      placing the reduced template mask on the reduced original image at the location based on the locations of the facial features to determine a cloning area to clone the reduced template image into the reduced original image; and
      applying Poisson cloning to clone the reduced template image into the reduced original image at the cloning area to form the new image;
   enlarging the new image; and
   displaying the enlarged new image.

11. The non-transitory computer-readable medium of claim 10, wherein said enlarging the new image comprises:

directly enlarging the reduced template image to match the template image at its original size where the enlarged reduced template image is missing pixels between known pixels;

subtracting known pixels in the enlarged reduced template image from corresponding pixels in the template image to form a difference image;

applying bilinear interpolation to the difference image to fill in missing pixels in the difference image; and adding the difference image to the template image to form a portion of the enlarged new image.

12. The non-transitory computer-readable medium of claim 11, after said enlarging the new image and prior to said displaying the enlarged new image, wherein the executable instructions further comprise:

cloning a portion of the template image at its original size into a boundary margin of missing pixels between the portion and an other portion of the enlarged new image.

13. The non-transitory computer-readable medium of claim 12, wherein said cloning a portion of the template image at its original size into a boundary margin of missing pixels between the portion and an other portion of the enlarged new image comprises:

applying Poisson cloning to clone the portion of the template image into the boundary margin of missing pixels between the portion and the other portion of the enlarged new image.

14. The non-transitory computer-readable medium of claim 12, after said cloning a portion of the template image and prior to said displaying the enlarged new image, the executable instructions further comprise:

smoothing a boundary between the portion and the other portion of the enlarged new image.

15. The non-transitory computer-readable medium of claim 14, wherein said smoothing a boundary comprises:

applying Poisson cloning to clone a source image into a destination image having same size as the enlarged new image to form an alpha image, all pixel in the source image having values of 0, all pixels within the boundary in the destination image having values of 0, and all pixels outside of the boundary in the destination image having values of 255; and using the alpha image to merge the enlarged new image and the original image.

16. The non-transitory computer-readable medium of claim 10, 13, or 15, wherein said applying Poisson cloning comprises:

generating a system of linear equations;

applying a Thomas algorithm to determine an initial solution; and applying a Conjugate Gradient algorithm using the initial solution to determine a final solution to the system of linear equations.

17. The non-transitory computer-readable medium of claim 16, wherein said applying a Thomas algorithm comprises:

determining a first solution to the system of linear equations by row;

determining a second solution to the system of linear equation by column; and averaging the first and the second solutions to create the initial solution.

18. The non-transitory computer-readable medium of claim 17, wherein said applying a Conjugate Gradient algorithm comprises applying block matrix operations to determine the final solution to the system of linear equations.

* * * * *